United States Patent
Kaushiva

(10) Patent No.: US 12,247,102 B2
(45) Date of Patent: Mar. 11, 2025

(54) PROCESS FOR THE PREPARATION OF POLYAMIDES

(71) Applicant: INV NYLON POLYMERS AMERICAS, LLC, Wilmington, DE (US)

(72) Inventor: Bryan D. Kaushiva, Yorkshire (GB)

(73) Assignee: INV NYLON POLYMERS AMERICAS, LLC

(*) Notice: Subject to any disclaimer, the term of this patent is extended or adjusted under 35 U.S.C. 154(b) by 720 days.

(21) Appl. No.: 17/430,459

(22) PCT Filed: Feb. 20, 2020

(86) PCT No.: PCT/IB2020/051411
§ 371 (c)(1),
(2) Date: Aug. 12, 2021

(87) PCT Pub. No.: WO2020/170179
PCT Pub. Date: Aug. 27, 2020

(65) Prior Publication Data
US 2022/0185961 A1 Jun. 16, 2022

Related U.S. Application Data

(60) Provisional application No. 62/808,320, filed on Feb. 21, 2019.

(51) Int. Cl.
*C08G 69/28* (2006.01)
*C08G 69/30* (2006.01)
*C08L 77/06* (2006.01)

(52) U.S. Cl.
CPC ............ *C08G 69/28* (2013.01); *C08G 69/30* (2013.01); *C08L 77/06* (2013.01); *C08J 2377/06* (2013.01)

(58) Field of Classification Search
CPC ......... C08G 69/28; C08G 69/30; C08L 77/06; C08J 2377/06
See application file for complete search history.

(56) References Cited

U.S. PATENT DOCUMENTS

| | | | |
|---|---|---|---|
| 4,131,712 A | 12/1978 | Sprauer | |
| 4,925,914 A | 5/1990 | Dolden et al. | |
| 5,057,597 A | 10/1991 | Koskan | |
| 5,128,442 A | 7/1992 | Pipper et al. | |
| 5,403,910 A | 4/1995 | Kosinski et al. | |
| 5,665,854 A | 9/1997 | Kosinski et al. | |
| 5,674,974 A * | 10/1997 | Brearley | C08G 69/28 528/340 |
| 5,859,177 A | 1/1999 | Berger et al. | |
| 9,834,643 B2 * | 12/2017 | Marchildon | B01J 19/18 |
| 2013/0172521 A1 | 7/2013 | Nakai et al. | |
| 2015/0322206 A1* | 11/2015 | Matsumoto | C08G 69/48 525/423 |
| 2016/0289384 A1* | 10/2016 | Marchildon | C08G 69/28 |
| 2017/0210850 A1 | 7/2017 | Van Laarhoven et al. | |
| 2018/0297933 A1 | 10/2018 | Grolman et al. | |

FOREIGN PATENT DOCUMENTS

| | | |
|---|---|---|
| CN | 102311545 A | 1/2012 |
| CN | 107849241 A | 3/2018 |
| EP | 2614105 B1 | 8/2014 |
| EP | 2951147 B1 | 8/2017 |
| IN | 201717001961 A | 5/2017 |
| JP | H0493323 A | 3/1992 |
| JP | 2016510335 A | 4/2016 |
| TW | I600636 B | 10/2017 |
| WO | 2020170179 A1 | 8/2020 |

OTHER PUBLICATIONS

Office Action received for Japanese patent application No. 2021549240, mailed on Aug. 9, 2022, 8 pages (4 pages of English Translation and 4 pages of official notification).
First Examination Report received for Indian patent application No. 202147037711, mailed on Oct. 25, 2021, 9 pages.
International Preliminary Report on Patentability received for PCT Application No. PCT/IB2020/051411, mailed on Sep. 2, 2021, 08 Pages.
International Search Report and Written Opinion received for PCT Application No. PCT/IB2020/051411, mailed on May 20, 2020, 11 Pages.

* cited by examiner

*Primary Examiner* — Gregory Listvoyb

(57) ABSTRACT

The present disclosure relates to a method for the production of polyamides having the benefit of simpler process control, lower thermal degradation and greater compositional flexibility. More particularly, it relates to processes of converting salts of diamines and dicarboxylic acids to polyamides in the solid state without a melt phase, by fluidizing solid diacid in a fluidizing gas.

13 Claims, 3 Drawing Sheets

PROCESS FOR THE PREPARATION OF POLYAMIDES

RELATED APPLICATION

This application is a National Stage entry of PCT/IB2020/051411, filed on Feb. 20, 2020, which claims the benefit of priority to U.S. Provisional Patent Application Ser. No. 62/808,320, filed Feb. 21, 2019, the disclosures of which are incorporated herein in its entirety by reference.

FIELD

The present disclosure relates to a method for the production of polyamides having the benefit of simpler process control, lower thermal degradation and greater compositional flexibility. More particularly, it relates to processes of converting salts of diamines and dicarboxylic acids to polyamides in the solid state without a melt phase.

BACKGROUND

There are several disadvantages to the conventional methods of preparing polyamides from aqueous nylon salt solutions. The salt preparation, salt solution storage and evaporative processes are generally designed within the limits of salt solubility to maintain phase homogeneity further leading to high pressure and high temperature specifications. Phase stability of the salt solutions is a key concern throughout and can become challenging for some combinations of starting materials. This is a further concern when the quality of a random copolymer is determined in part by maintaining a homogenous solution during processing. Degradation is commonly controlled by limiting process and storage temperatures of solutions, and this imposes an additional boundary on the process conditions. The rate of evaporation and pressure changes are further complexities in such process schemes and again must be designed around stability of either the solution at the front end or of the melt as the process finishes. Achieving a high degree of polymerization in melt state processing exposes the polymer to possible thermal degradation, and this is especially true for compositions with high melt temperatures. Finally, solution and melt process can also be encumbered with concerns deriving from foam development and entrainment and loss of materials with the exiting water vapor.

Processing precipitated salts offers an alternative. Such salts can be collected from aqueous or non-aqueous solutions at much lower temperatures than the temperatures needed to maintain solubility. Complex salt compositions that exhibit limited solubility and offer challenging melt processing characteristics are comparatively simple to precipitate. The processes of polymerizing in the solid state must only be designed to maintain fluidity of the solids rather than the more complex phase envelope considered above. Such solid phase polymerization processes can operate at between about 70 to 230° C. lower temperatures than analogous melt phase processes, thereby significantly reducing thermal degradation. Workers have sought to exploit these possible benefits of this polymerization route.

U.S. Pat. No. 4,131,712 discloses a process for making a high molecular weight polyamide, wherein a diacid-rich component and a diamine-rich component are prepared separately in nonstoichiometric proportions.

U.S. Pat. No. 4,925,914 discloses a polymerization process based on precipitated nylon salts of various compositions. A dispersion or suspension of the finely divided salt is created in a liquid aliphatic hydrocarbon medium. 0.01-5% of a hypophosphite catalyst is blended in uniformly at some point prior to heating. The mixture is then held in reflux at a temperature above 100° C. but about 15-20° C. lower than the lowest of either the melting temperature of the salt or of the final polyamide.

Japanese patent application 04-093323 discloses a multi-step process for preparing high molecular weight polyhexamethyleneadipamide with low levels of the cross-linking degradant bishexamethylenetriamine.

U.S. Pat. No. 5,128,442 discloses a three-step process for the production of polyamides.

U.S. Pat. Nos. 5,403,910 and 5,665,854 disclose a two-step polyamidation processes conducted at atmospheric pressures and low temperatures.

European Patent Publication No. 2,614,105 B1 describes the post-condensation finishing of polyamides using a carrier gas and an acid, anhydride, lactone, ammonia, amine or various mixtures under pressures of from 0.01 to 10 bar.

The production of polyamides from salts can have advantages, but it does require having the salt as a starting material. It can also be advantageous to have a process that is only fed the base monomers.

United States Published Application No. 2013/0172521 A1 discloses a discontinuous dry process for producing nylon salt powders and subsequently polymerizing them.

European Patent Publication No. 2,951,147 B1 relates to a process for preparing a salt from diamine and dicarboxylic acid, the salt being referred to as an diamine/dicarboxylic acid salt.

U.S. Pat. No. 4,131,712 relates to a process for preparing high molecular weight polyamides, which is carried out in liquid phase, and in the absence of organic solvents or of large amounts of water.

It may thus be seen that challenges remain. It would be desirable to have a process and design that is amenable to continuous operation that does not require the complexity of mechanical agitation. It is necessary for such a design to avoid eutectic melting behaviours to keep the bed operating as a powder or particulate.

SUMMARY

Disclosed is a process for making at least one of a polyamide and a polyamide salt comprising fluidizing a finely divided solid diacid in a fluidizing gas and reacting the finely divided solid diacid with diamine in a reaction zone.

The fluidizing gas can comprise diamine droplets or diamine gas.

The finely divided solid diacid can comprise an aliphatic diacid.

The aliphatic diacid can comprise adipic acid.

The diamine can comprise an aliphatic diamine such as hexamethylenediamine

The process can include controlling the fluidizing regime within the reaction zone by regulating the pressure differential across the reaction zone.

The pressure regulation can include applying vacuum to an outlet of the reaction zone and controlling flow at an inlet to the reaction zone to achieve a desired degree of fluidization.

The pressure regulation can comprise feeding pressurized fluid to the reaction zone to achieve a desired degree of fluidization.

The pressure regulation can be carried out in the absence of vacuum draw from the reaction zone.

The process can include charging diamine vapor to the reaction zone.

The diamine vapor charge rate can be controlled to maintain a desired diacid:diamine balance in the reaction zone.

The process can include introducing an inert gas to the reaction zone. Examples of suitable inert gases can include nitrogen and steam.

The steam introduction rate can be controlled to improve at least one product quality measure. Examples of product quality include whiteness.

The process can further include:
a) Carrying out the polyamidation in batch or continuous mode in a plurality of sequential reaction beds;
b) Injecting an inert gas to fluidize fully inert (i.e. steam or nitrogen or other inert gases or vapors) feeds to at least one later sequential reaction bed to fluidize a polyamidation reaction; and
c) injecting molten or vaporised diamines to the head space of at least one earlier sequential reaction bed to control diacid:diamine balance.

The disclosed polyamidation reaction can produce any suitable polyamide, including partially aromatic polyamides. One suitable polyamide is nylon-6,6.

In the disclosed process, polyamidation can include carrying out in at least a portion of the polyamidation in a twin-screw extruder, monitoring the diacid:diamine balance in the output from the twin-screw extruder and controlling a trim diamine feed rate to the twin screw extruder based on the monitored diacid:diamine balance in the output from the twin-screw extruder.

The polyamidation process can further include carrying out polymerization in a twin screw extruder, measuring at least one of the moisture content and the relative viscosity of the twin-screw extruder output and controlling the vacuum level within the twin-screw extruder to control at least one of the moisture content and the relative viscosity of the twin-screw extruder output.

The output of the twin-screw extruder can optionally be fed to a continuous polymerizer for finishing the desired polymerization. This embodiment can include predicting a desired relative viscosity or moisture content that an at least partially polymerized feed would produce at the outlet of a continuous polymerizer and adjusting the twin-screw extruder output moisture content or relative viscosity to achieve the desired relative viscosity or moisture content at the outlet of the continuous polymerizer.

DETAILED DESCRIPTION

Figure 1:
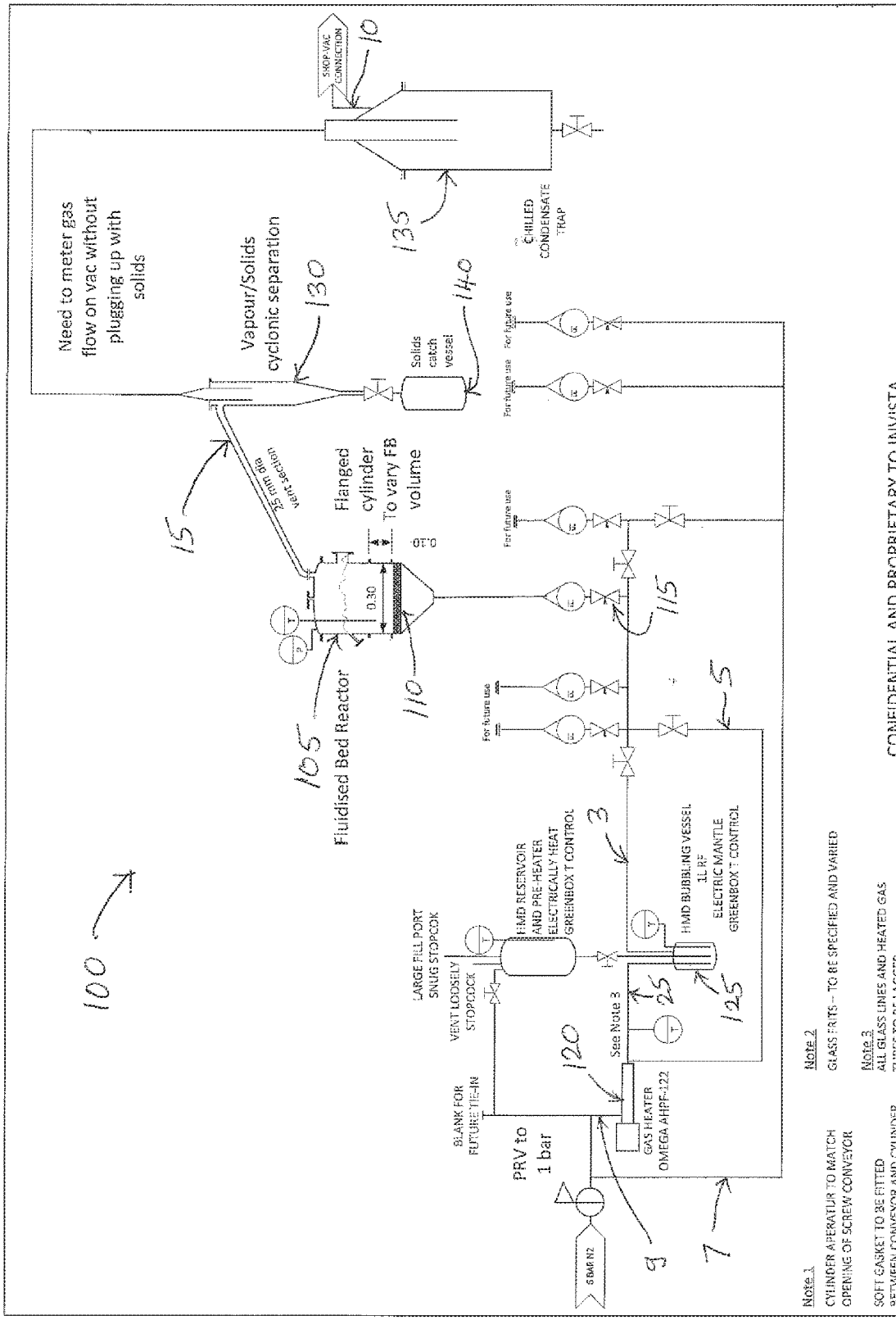
FIG. 1 is a schematic representation of an embodiment of Example 1 and according to the present disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the suitable methods and materials are now described.

As will be apparent to those of skill in the art upon reading this disclosure, each of the individual embodiments described and illustrated herein has discrete components and features that may be readily separated from or combined with the features of any of the other several embodiments without departing from the scope or spirit of the present disclosure. Any recited method can be carried out in the order of events recited or in any other order that is logically possible.

The following examples are put forth to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, percentages are by weight, parts are by weight, temperature is in ° C., and pressure is in atmospheres. For example, all percent compositions are given as weight-percentages, unless otherwise stated. When solutions of components are referred to, percentages refer to weight-percentages of the composition including the solvent (e.g., water) unless otherwise indicated. All molecular weights of polymers are weight-average molecular weights, unless otherwise specified. Standard temperature and pressure are defined as 20° C. and 1 atmosphere absolute.

Nylon salts are converted to nylon polymers in either multi-step batch reactors or multi-stage continuous processes. These processes are operated at pressures substantially different enough from atmospheric pressure to affect fluidization of the bed of solids.

The disclosed process can operate through at least two stages: a pre-polymerization stage and a polymerization stage. In alternative embodiments, molten blend stages can be incorporated following either polymerization or polymerization stages to effect further polymerization or full copolymerization of blends of reactant feeds. In alternative embodiments, the process steps are physically separated and the solid polyamide precursors are collected after the initial stage for separate processing later.

When the product is to be collected as a solid after the precursor formation stage, then this stage—often conducted at below about 200° C., for example, less than about 180-190° C. but defined by degree of amidation—the fluidized reaction bed must contain enough diamine to achieve the desired degree of balance in the final product. For example, the precursor formation stages can be operated at temperatures <200° C., for example, >20 to <120° C., for example >40 to <100° C. The temperature limit is determined by the requirement to avoid eutectic melting as defined for the composition being produced. The diamine or diamines may be injected as a liquid to the hot fluidized bed or it may be carried in the incoming vapor or gas feed. The precursor formation is effectively accomplished when the diamine in the gas or vapor feed can be terminated without having the product deviate from acceptable specifications of balance.

When there is no separate collection of solid precursors, the temperature of each successive stage is increased in a way that is defined by the building composition that avoids eutectic melting. Temperatures may be increased to >100° C. once the diamine mole fraction in the solids has surpassed about 0.23-0.24 for nylon 6,6. Driving polymerization in these later stages requires higher temperatures that lead to increasing diamine vapor losses. Thus diamine is fed at additional lower stages to eventually achieve the desired degree of balance. The fluidized reaction bed may contain diamine in the gas or vapor feed but alternatively can be substantially inert. For example, a polymerization stage can be operated above 195° C., for example above 200° C., for example above 210° C. The fluidized reaction bed can be fully inert (i.e., stoichiometrically balanced between diacid and diamine) such that the reacting mass avoids losing monomer, thus reducing the risk of the final product being unacceptable in the final use due to an imbalance of monomer reactants.

Polymerization catalysts may be used. Such catalysts can be incorporated either through the salt solution prior to salt crystallisation or via solids addition or via solids compacting or milling or grinding together.

Polymer additives may be incorporated at any convenient stage. If a desired polymer additive tends to react to an undesired product at elevated temperature, then the additive can be added later in the process, for example, as close to the completion of polymerization as commercially reasonable.

The process is usually controlled so that at no time does the reacting blend of solids ever become fully molten.

For some copolymer compositions it is advantageous to feed dry nylon salts of different compositions or to feed multiple monomers in appropriate proportions. It is acceptable for some applications for these blends to be fully converted without undergoing a full-melt homogenization. For other applications, blends may be converted through at least the pre-polymerization stage prior to feeding to a melt blend process such as an extruder. Pelletized products of the melt-blend operation can be converted further via solid-phase polymerization or they may be used directly in moulding or fabrication operations.

The polyamide described herein can be any suitable polyamide. Polyamides and copolyamides are derived from diamines and dicarboxylic acids and/or from aminocarboxylic acids or the corresponding lactams, such as polyamide 4, polyamide 6, polyamide 66, polyamide 610, polyamide 69, polyamide 612, polyamide 46, polyamide 1212, polyamide 11, polyamide 12, semi-aromatic poly-amides derived from diamines and dicarboxylic acids, such as and without limitation, m-xylylenediamine (MXD) and adipic acid (known in the industry as polyamide MXD6); other semi-polyamides prepared from diamines and dicarboxylic acids, such as and without limitation, hexamethylenediamine and iso- and/or terephthalic acid.

For example, the monomers can be selected from the group consisting of tetramethylenediamine, hexamethylenediamine, 2-methylpentamethylenediamine (D), diaminodecane, diaminododecane, 2,4,4-trimethylhexamethylenediamine, 2,2,4-trimethylhexamethylenediamine, adipic acid, azelaic acid, sebacic acid, dodecanedioic acid, iso- and/or terephthalic acid, ε-caprolactam, undecanlactam, laurolactam, and mixtures thereof. Monomers may also include those which may contribute to the flame-retardant behavior of the whole system, such as a phosphorus containing monomer, for example, bis(2-carboxyethyl)phenylphosphineoxide.

The monomers can include hexamethylenediamine and adipic acid. For instance, the polyamide can be a polyamide PA 46, PA 66; PA 69; PA 610, PA 612, PA 1012, PA 1212, PA 6, PA 11, PA 12, PA 66/6T, PA 6I/6T, PA DT/6T, PA 66/6I/6T, or blends thereof, such as PA6/PA66. The polyamide can be nylon 66 and the composition can optionally be substantially free of all other polyamides (e.g., nylon 66 can be the only polyamide used to form the composition).

Polyamides can be manufactured by polymerization of dicarboxylic acids and diacid derivatives and diamines. In some cases, polyamides may be produced via polymerization of aminocarboxylic acids, aminonitriles, or lactams. The dicarboxylic acid component is suitably at least one dicarboxylic acid of the molecular formula $HO_2C-R^1-CO_2H$; wherein $R^1$ represents a divalent aliphatic, cycloaliphatic or aromatic radical or a covalent bond. $R^1$ suitably includes from 2 to 20 carbon atoms, for example 2 to 12 carbon atoms, for example 2 to 10 carbon atoms. $R^1$ may be a linear or branched, for example linear, alkylene radical including 2 to 12 carbon atoms, or 2 to 10 carbon atoms, for example 2, 4, 6 or 8 carbon atoms, an unsubstituted phenylene radical, or an unsubstituted cyclohexylene radical. Optionally, $R^1$ may contain one or more ether groups. For example, $R^1$ is an alkylene radical, for example a linear alkylene radical, including 2 to 12 carbon atoms, or 2 to 10 carbon atoms, for example 2, 4, 6 or 8 carbon atoms.

Specific examples of suitable dicarboxylic acids include hexane-1,6-dioic acid (adipic acid), octane-1,8-dioic acid (suberic acid), decane-1,10-dioic acid (sebacic acid), dodecane-1,12-dioic acid, 1,2-cyclohexanedicarboxylic acid, 1,3-cyclohexanedicarboxylic acid, 1,4-cyclohexanedicarboxylic acid, 1,2-cyclohexanediacetic acid, 1,3-cyclohexanediacetic acid, benzene-1,2-dicarboxylic acid (phthalic acid), benzene-1,3-dicarboxylic acid (isophthalic acid), benzene-1,4-dicarboxylic acid (terephthalic acid), 4,4'-oxybis(benzoic acid), and 2,6-naphthalene dicarboxylic acid. A suitable dicarboxylic acid is hexane-1,6-dioic acid (adipic acid).

The diamine component is suitably at least one diamine of the formula $H_2N-R^2-NH_2$; wherein $R^2$ represents a divalent aliphatic, cycloaliphatic or aromatic radical. $R^2$ suitably includes from 2 to 20 carbon atoms, for example 4 to 12 carbon atoms, for example 4 to 10 carbon atoms. $R^2$ may be a linear or branched, for example linear, alkylene radical including 4 to 12 carbon atoms, for example 4 to 10 carbon atoms, for example 4, 6 or 8 carbon atoms, an unsubstituted phenylene radical, or an unsubstituted cyclohexylene radical. Optionally, $R^2$ may contain one or more ether groups. For example, $R^2$ is an alkylene radical, for example a linear alkylene radical, including 4 to 12 carbon atoms, or 4 to 10 carbon atoms, for example 2, 4, 6 or 8 carbon atoms.

Specific examples of suitable diamines include tetramethylene diamine, pentamethylene diamine, hexamethylene diamine, octamethylene diamine, decamethylene diamine, dodecamethylene diamine, 2-methylpentamethylene diamine, 3-methylpentamethylene diamine, 2-methylhexamethylene diamine, 3-methylhexamethylene diamine, 2,5-dimethylhexamethylene diamine, 2,2,4-trimethylhexamethylene diamine, 2,4,4-trimethylhexamethylene diamine, 2,7-dimethyloctamethylene diamine, 2,2,7,7-tetramethyloctamethylene diamine, 1,2-cyclohexanediamine, 1,3-cyclohexanediamine, 1,4-cyclohexanediamine, 4,4'-diaminodicyclohexylmethane, benzene-1,2-diamine, benzene-1,3-diamine and benzene-1,4-diamine. A suitable diamine is hexamethylene diamine.

The aromatic diacid is suitably at least one diacid of the formula $HO-C(O)-R^3-C(O)-OH$, wherein the variable $R^3$ is substituted or unsubstituted aryl, such as phenyl. In one aspect, the aromatic diacid is terephthalic acid.

The polyamide resin can further include a catalyst. In one aspect, the catalyst can be present in the polyamide resin in an amount ranging from 10 ppm to 1,000 ppm by weight. In another aspect, the catalyst can be present in an amount ranging from 10 ppm to 300 ppm by weight. The catalyst can include, without limitation, phosphorus and oxyphosphorus compounds, such as, phosphoric acid, phosphorous acid, hypophosphorous acid, hypophosphoric acid, arylphosphonic acids, arylphosphinic acids, salts thereof, and mixtures thereof. In one aspect, the catalyst can be sodium hypophosphite (SHP), manganese hypophosphite, sodium phenylphosphinate, sodium phenylphosphonate, potassium phenylphosphinate, potassium phenylphosphonate, hexamethylenediammonium bis-phenylphosphinate, potassium tolylphosphinate, or mixtures thereof. In one aspect, the catalyst can be sodium hypophosphite (SHP).

In one aspect of the disclosed process, it is desirable to maintain the temperature of the precursor forming zone to below 120° C., for example, below 100° C., in order to avoid the amidation reaction and maintain fluidity and avoid eutectic melting. A DSC [Differential Scanning Calorimetry] test analysis can be performed on a sample obtained from the salt formation zone to determine any onset of the oligomer and/or polymer formation. When solid precursors are to be collected as a separate product this is a useful method for optimising the temperature profile of the precursor formation process.

The industrial utility of the present disclosure can be realized, wherein, the finely divided salt, prepared according to the present disclosure, can be a suitable feed for a melt reactor, for example an autoclave or an extruder, for example a twin-screw extruder. The finely divided salt is also advantageous for uniform blending with additives, especially dry additives including masterbatch additives that are also finely divided.

The salt preparation process of the present disclosure may be suitably accomplished in a fluidized bed equipment. A dry finely divided diacid may be adequately fluidized using a diamine-containing fluidizing gas stream such that there is a balance of mechanical energy input and fluidization turbulence for good back-mixing in the bed. It is to be appreciated that at the low end of mechanical energy input for fluidization, localized hot-spots and high temperature regions may develop leading to particles sticking to each other and agglomerating into lumps. As the mechanical energy is progressively increased, the fluidization may stably be achieved with good turbulence for mixing, and uniform momentum and heat transfer. In this fluidization regime hot spots may be avoided leading to particle agglomeration. At the high end of mechanical energy input for fluidization, high gas momentum may carry the particles airborne thereby reducing the effectiveness of fluidization.

In the salt preparation process of the present disclosure, an industrial or commercial supply of dry diacid solids may be suitable under the fluidization conditions, for example, dry adipic acid solids. Industrial adipic acid products may be available in the following ranges:

average particle sizes [$D_{50}$] range between 100-450 micrometers;
% fines (below 75 microns) range between <5 to 25 (vol. %) and in some cases as high as 45 vol. %;
bulk density ranges between 721-881 kg/m$^3$;
% fines vary with the mean particle size (in micrometers) as below:

| Mean Particle Size (micrometers) | Fines (vol. %) |
|---|---|
| 350-450 | <5% |
| 250-350 | 5-10% |
| 200-300 | 10-15% |
| 150-200 | 15-25% |

It is to be understood that the fluidization conditions in the present disclosure can be adjusted to accommodate dry diacid solid particles with mean particle sizes from about 10-5000 micrometers, such as from about 10-1000 micrometers, or from about 20-800 micrometers, or even from about 25-700 micrometers. There is no limit so long as the fluidization conditions can be accomplished in a most efficient manner. The particle size discussion is also applicable to a blend of diacid powders depending on the type of polyamide that is to be produced with the resulting salt.

The conventional production methods for making polyamides rely on continuing beyond the salt production (commonly known as the salt strike step) and proceed to amidation via polycondensation reaction. Once the solid salt crystals start to further react, diamine loss is typically observed from the particles. Thus, it is especially important to control the process conditions according to the present disclosure to form the salt and not move forward to the polyamide if the precursors are to be collected as a separated solid product.

The disclosed process is a marked improvement in the most energy intensive step in a convention polyamide process, wherein, a large excess of adipic acid [AA] solids are dissolved along with hexamethylenediamine [HMD] in water, then evaporating the water while polymerizing the AA and HMD to make nylon 6,6 by implementing pressure-temperature cycles.

From a control perspective, the claimed process is counterintuitive. Examples of methods for controlling AA to HMD balance include: (a) drawing a stream of fluidized particles, dissolving in water and measuring pH; (b) Raman spectroscopy; (c) FTIR or near-IR; and (d) monitor the HMD in the exiting gas. For option (d), the net loss of HMD desirably approaches zero.

EXAMPLE 1

A fluidized bed reactor system 100 is schematically represented in FIG. 1. The fluidized bed reactor 105 of 300 mm (0.3 m) diameter is joined above a glass frit 110 serving as a plenum. The fluidized bed has a working height of about 300 mm (0.3 m) from the frit to the vent. The supply gas is nitrogen which is restricted in pressure via a regulator. The reactor unit 105 can be operated under vacuum via a flow connection 10 to a building vacuum system (not shown) with the pressure regulation valve set to a lower setting. Alternatively, the reactor unit 105 can be operated under pressure by changing the setting on the nitrogen supply pressure regulation valve. Flow to the fluidized bed 105 is set via a needle valve 115. The incoming gas flow is heated to a setpoint using an in-line gas heater 120. The reactor unit 105 is designed so the heated gas exiting the gas heater 120 may be fed through a heated liquid vessel 125 to incorporate a vapor content in the gas feed stream 3, or it can alternatively be immediately switched to bypass the heated liquid vessel 125 and operate without a vapor component in the gas feed stream 5. The reactor unit 105 also has a vent flow connection 15 that vents through a gas/solid separation unit 130 and a condensate trap unit 135. A catch vessel unit 140 is connected to the gas/solid separation unit 130 for collecting any separated solids.

About 3 kgs of dry nylon 6,6 salt are loaded via the top port of the fluidized bed unit 105. The port is then sealed with a stopcock. The salt is deoxygenated with a purge of unheated nitrogen gas feed stream 7. The gas feed stream 9 is then flowed through the in-line gas heater 120, heated to about 180° C. and the hot gas feed stream 25 is fed via a bubbler in the heated liquid vessel 125 to bubble through a volume of anhydrous molten hexamethylenediamine [HMD] which is also maintained at 180° C. The hot gas feed stream 3 exiting the heated liquid vessel 125 incorporates the hexamethylenediamine [HMD] vapor. The supply pressure regulating valve is set to 1 bar, the building vacuum system is turned on, and flow is regulated through the fluidized bed unit 105 via the needle valve 115. The HMD-vapor laden hot gas feed flow is controlled to a rate of about 1700 liters per minute [lpm]. This results in a steady bubbling in the fluidized bed unit 105. The fluidized bed unit 105 is kept in this condition for about 4 hours.

After that time, the hot gas feed stream 3 temperature is stepped up to 220° C. The flow is maintained at 1700 lpm. The fluidized bed unit 105 is maintained in this condition for additional 2 hours.

After that time and while maintaining the hot gas feed temperature at 220° C., the gas stream exiting the gas heater 120 is redirected so that it bypasses the heated liquid vessel 125 containing anhydrous molten hexamethylenediamine [HMD]. In this condition the heated gas stream 5 is fed to the fluidized bed unit 105. The fluidized bed unit 105 is operated with this feed for another two hours.

After that time, the gas heater 120 is switched off and the fluidized nitrogen feed is used to cool the fluidized solids down to ambient temperatures.

The resulting solids recovered from the fluidized bed unit 105 are observed to have lost less than 30 meq of amine per kg of solids and exhibit a polymer relative viscosity (RV) of 9.

EXAMPLE 2

Figure 2:
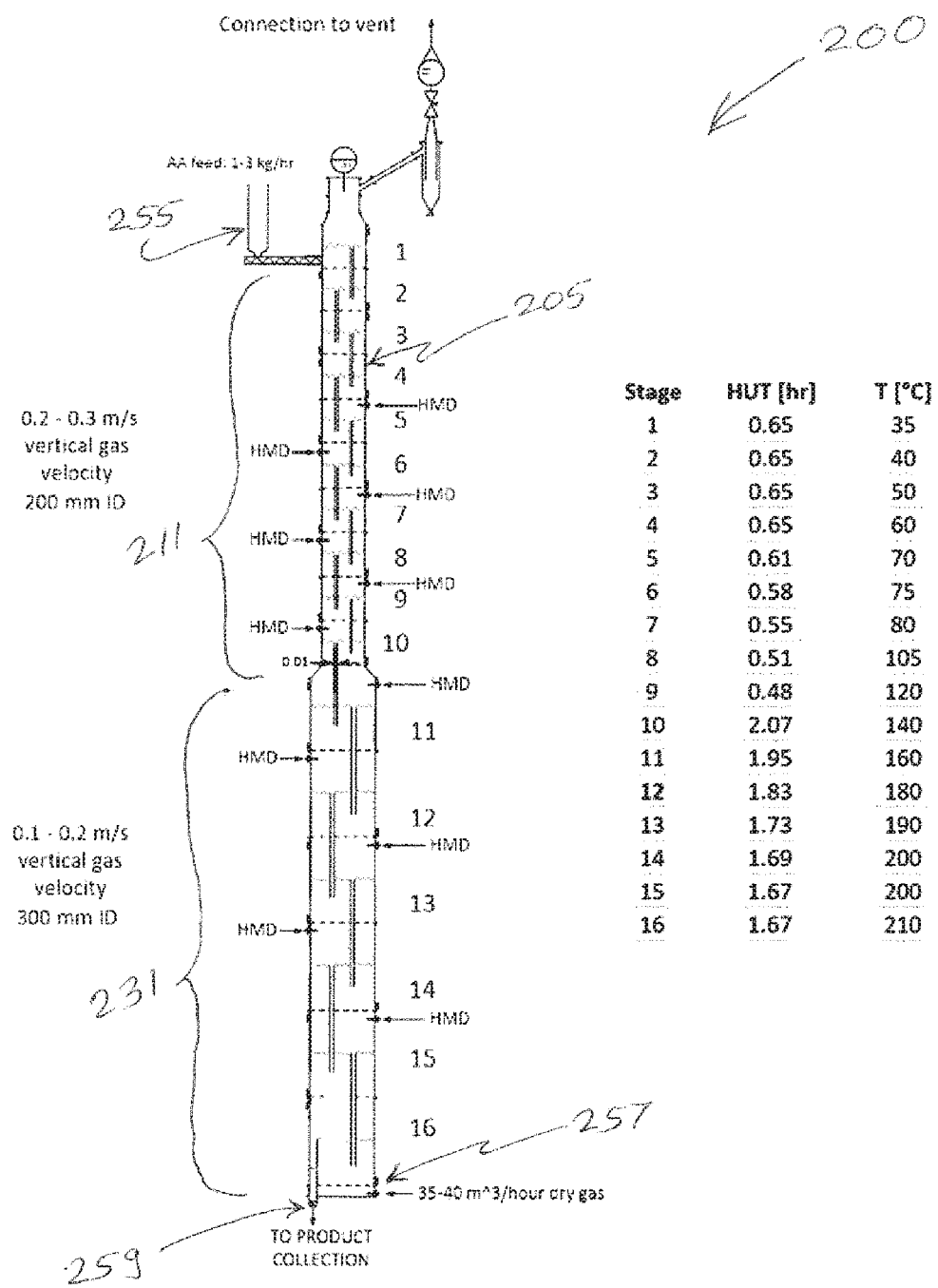
FIG. 2 is a schematic representation of an embodiment as in Examples 2-4, and according to the present disclosure.

A continuous polyamidation system 200 is schematically represented in FIG. 2. The system 200 comprises a cascade reactor unit 205 made up of 16 fluidized bed sections (as numbered from top to bottom) and each section equipped with overflow weir tubes. Each overflow weir tube leads deep enough into the next lower bed to avoid detectable vapor bypassing.

The feed gas supply arrangement is described in Example 1 and FIG. 1, i.e., allowing incoming nitrogen gas to be heated]. Also, the gas feed can be bypassed the heated liquid vessel and fed to the unit 205.

A volumetric feeder (referred to as a versa feeder) is fitted gas-tight to the top stage and back flushed with nitrogen to prevent ingress of oxygen to the reactor.

The top section 211, with stages numbered 1 through 10, has an internal diameter of 200 mm (0.2 m). The bottom section 231, with stages numbered 11 through 16, has an internal diameter of 300 mm (0.3 m). This allows the rising vapor stream to accelerate as the section diameters get smaller as the vapor flows upward, which may improve heat and mass transfer via better fluidization in the upper sections of the unit 205.

Temperature regulation within each stage is achieved through hot medium recirculation through tubes that run horizontally across the fluidizing beds of the respective stages. These may have independent temperature controls so that an axial temperature profile can be maintained for unit 205. Jacket heaters may also be used in any section or stage to help conserve and regulate heat. This augments the heat provided by the rising vapor flow.

About 1.8 kg/hr of dry nylon 6,6 salt is fed to the top-most stage using a solid feeder 255. About 35-40 m³ per hour of dry nitrogen is fed to the bottom-most stage at gas inlet port 257. The rising vapor gas velocities are determined to be about 0.2-0.3 m/s in the top section 211 and about 0.1-0.2 m/s in the bottom section 231. The stage-wise fluidized and cascading solids hold-up time [HUT in hr] and axial temperature profile [in ° C.] are shown in FIG. 2 side table.

About 1.55 kg/hr of nylon 6,6 polymer is obtained from this operation at a bottom product port 259. The nylon 6,6 polymer product has a relative viscosity of 15.

EXAMPLE 3

Using the unit arrangement and processing conditions described in Example 2 and FIG. 2, an additional liquid hexamethylene diamine [HMD] is fed directly into the head space above stage 13 via an inlet port 261 in combination with heated dry nitrogen gas fed to the bottom-most stage. It is also possible to feed additional liquid HMD at various stages along the axial length and as shown in FIG. 2 via any of the inlet ports 265. This provides better balance control and higher relative viscosity in the product recovered from the cascade system 205.

EXAMPLE 4

Using the unit 200 arrangement described in Example 2 and FIG. 2, the solid feed is changed from dry salt to adipic acid. Hexamethylenediamine adipate is produced by feeding adipic acid at about 1 kg/hr via the solids feeder at the top and liquid hexamethylene diamine [HMD] is fed directly into the head space above stages 7, 9, 11 and 13 via an inlet shown in combination with heated dry nitrogen gas fed to the bottom-most stage 16. It is found that fine balance control can be improved by a controlled injection of diamine into the dry nitrogen feed as it connects to the plenum below stage 16. Temperatures are regulated through the equipment described to keep the solids beds at or below 90-100° C. This keeps the system in a free-flowing state and avoids oligomer formation. This yields a substantially dry nylon salt at a rate of about 1.8 kg/hr.

EXAMPLE 5

Figure 3:
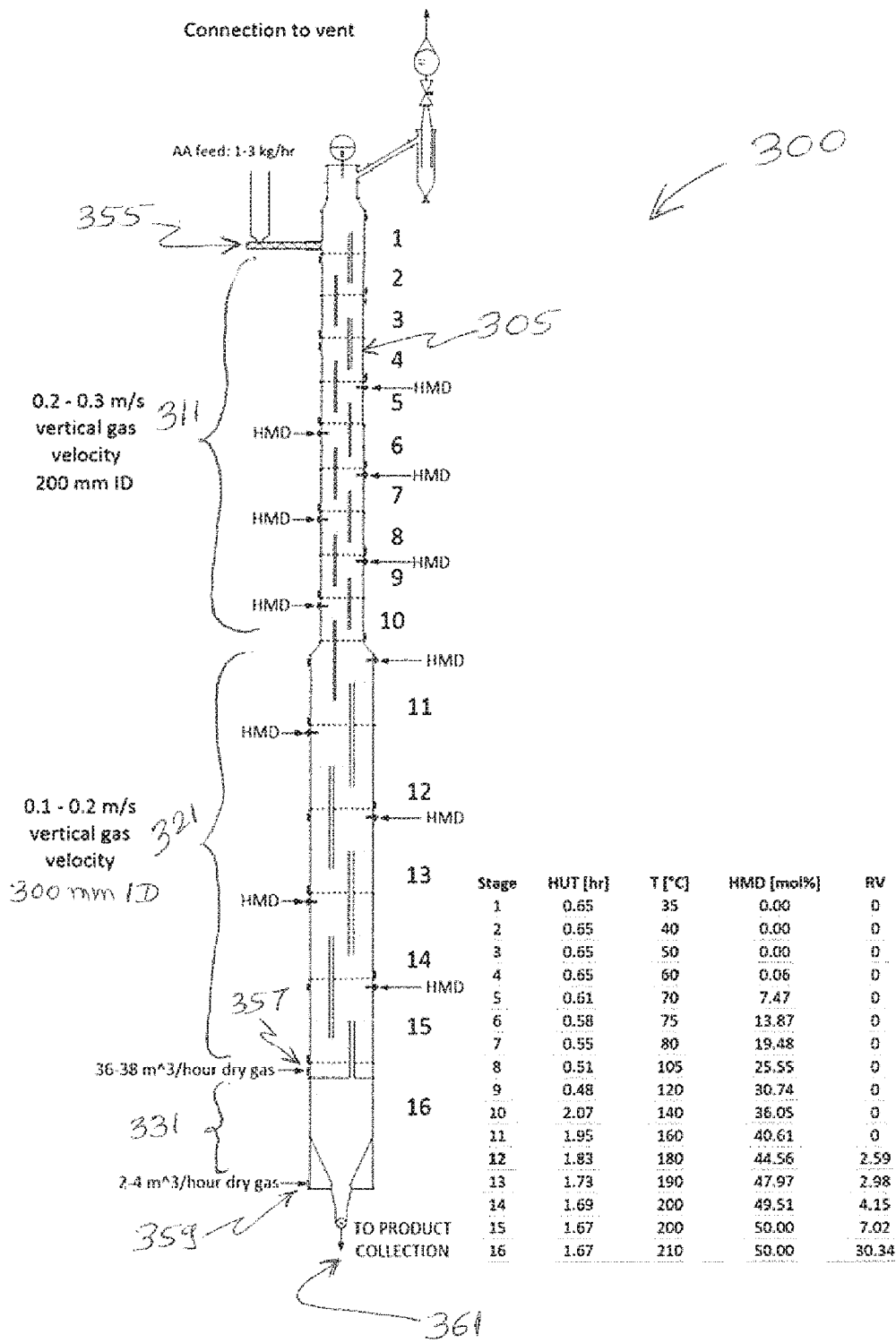
FIG. 3 is a schematic representation of an embodiment as in Examples 5-6 and according to the present disclosure.

A continuous polyamidation system 300 is schematically represented in FIG. 3. The system 300 comprises a cascade reactor unit 305 made up of 15 fluidized bed sections (as numbered from top to bottom) and each section equipped with overflow weir tubes. An additional 16$^{th}$ stage is added below the last fluidised stage, and this static column is used for solid phasing the product in a plug flow manner to a controlled endpoint. Each overflow weir tube leads deep enough into the next lower bed to avoid detectable vapor bypassing. The overall section-to-section unit arrangement, internal diameters and inlet/outlet configurations for system 300 are very similar to the ones described in Example 2 and FIG. 2.

In this example, neat adipic acid is fed to the top-most stage using a solid feeder system 355. The top stages assist in heating up the incoming solid feed as it is fluidized and cascaded down the unit. The top stages also play an important function of absorbing any residual diamine present in the rising vapor stream.

The top section 311, with stages numbered 1 through 10, has an internal diameter of 200 mm (0.20 m). The middle section 321, with stages numbered 13 through 15, has an internal diameter of 300 mm (0.3 m). This allows the rising vapor stream to accelerate as the section diameters get smaller as the vapor flows upward, which may improve heat and mass transfer via better fluidization in the upper sections of the unit 305. The lowest section 331 is not fluidized and it is shown here as stage 16. Stage 16 also has an internal diameter of 300 mm (0.30 m) but it is fed with a much lower gas feed rate. There is a plenum interposed between stage 15 and 16 to allow for distribution of the additional fluidizing gas.

Temperature regulation within each stage is achieved through hot medium recirculation through tubes that run horizontally across the fluidizing beds of the respective stages. These may have independent temperature controls so that an axial temperature profile can be maintained for unit 305. Jacket heaters may also be used in any section or stage to help conserve and regulate heat. This augments the heat provided by the rising vapor flow.

The top cascading stages in Section 311 are primarily used to bring the incoming feed up to temperature.

Acid feeds that contain a significant fraction of aliphatic diacids tend to exhibit eutectic melting behavior that can lead to bed collapse. Therefore, the inter-stage HMD feeds are such controlled to keep the composition at temperature across the respective stages far enough from a melting region to avoid operability problems arising from bed collapse.

Once the eutectic composition is passed, it is the duty of the middle stages of the column to bring the diacid and diamine closer to final balance and supplement the heat of absorption and ionisation.

The column is fitted with an optical instrument for providing feedback regarding composition of the solids. It is found that either the ABB Talus FTNIR instrument or the Tornado Raman both provide good calibrations sufficient to support operation. It is found that once stable operation is established, only one feedback point at stage 15 may be necessary for maintaining the polymer in stable quality. Multiple points along the axial length of system 305 can improve start-up control. It is particularly beneficial to monitor the composition at stage 8 to avoid the occurrence of eutectic melting.

Stages 11 through 16 in Sections 321-331 provide the residence time to achieve the desired molecular weight build.

About 1-3 kg/hr of dry adipic acid solids are fed to the top-most stage using a solid feeder 355. About 36-38 m³ per hour of dry nitrogen is fed to the bottom-most stage at gas inlet port 357. The rising vapor gas velocities are determined to be about 0.2-0.3 m/s in the top section 311, and about 0.1-0.2 m/s in section 321.

About 2-4 m³/hour of dry nitrogen is fed to the static bed of stage 16 at gas inlet port 359. This is sufficient to drive the solid phase polymerisation in the lowest stage. The stage-wise fluidized and cascading solids hold-up time [HUT in hr] and axial temperature profile [in ° C.] are shown in FIG. 3 side table.

About 1.5-2.5 kg/hr nylon 6,6 polymer is obtained from this operation at a bottom product port 361. The nylon 6,6 polymer product has a relative viscosity of 30.5.

EXAMPLE 6

The unit arrangement and processing conditions described in Example 3 are modified by removing stage 16 and directly feeding the product of Stage 15 to a vented twin screw extruder. This extruder is configured to have one unfilled section for additive addition. It is also fitted with an atmospheric vent and a vacuum vent section. An HMD trim feed is configured to injection heated HMD into the unfilled section.

The output connection of the extruder is fitted with the probes for FT-NIR to monitor the molten nylon. This signal is used with different spectral models to the moisture content, the ends balance and relative viscosity. The output of the relative viscosity model and moisture content model is used to adjust the vacuum pressure in the last vented section of the extruder. The ends balance is used in a direct feedback loop to control the flow rate of a trim feed of HMD to an unfilled injection stage in the extruder. The trim feed is controlled within a rate of 1 to 3 g/minute.

The output of the extruder is pumped through a pipeline with a fifteen minute hold up time. This allows incorporation of the diamine and RV build to occur. The melt is then extruded through a die into laces and pelletised. About 1.5-2.5 kg/hr nylon 6,6 polymer is obtained from this operation with a relative viscosity of 34.6.

While the forgoing examples are illustrative of the principles of the present disclosure in one or more particular applications, it will be apparent to those of ordinary skill in the art that numerous modifications in form, usage and details of implementation can be made without the exercise of inventive faculty, and without departing from the principles and concepts of the disclosure. Accordingly, it is not intended that the disclosure be limited, except as by the claims set forth below.

While the disclosure has been described and exemplified in sufficient detail for those skilled in this art to make and use it, various alternatives, modifications, and improvements will be apparent to those skilled in the art without departing from the spirit and scope of the claims.

All patents and publications referred to herein are incorporated by reference herein to the same extent as if each individual publication was specifically and individually indicated to be incorporated by reference in its entirety.

The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present disclosure has been specifically disclosed by preferred embodiments and optional features, modification and variation of the concepts herein disclosed may be resorted to by those skilled in the art, and that such modifications and variations are considered to be within the scope of this disclosure as defined by the appended claims

What is claimed is:

1. A process for making at least one of a polyamide or a polyamide salt comprising:
    feeding a finely divided solid diacid comprising adipic acid at a temperature below 100° C. to a cascade reactor unit comprising a reaction zone that comprises a plurality of vertically-stacked fluidized bed sections;
    fluidizing the finely divided solid diacid in a fluidizing gas; and
    reacting the finely divided solid diacid with diamine comprising hexamethylenediamine in the reaction zone to form at least one of the polyamide comprising nylon-6,6 or the polyamide salt comprising a nylon-6,6 salt.

2. The process of claim 1 wherein the fluidizing gas comprises diamine droplets or diamine gas.

3. The process of claim 1 further comprising controlling a fluidizing regime within the reaction zone by regulating a pressure differential across the reaction zone.

4. The process of claim 3 wherein the pressure regulation comprises applying vacuum to an outlet of the reaction zone and controlling flow at an inlet to the reaction zone to achieve a desired degree of fluidization.

5. The process of claim 3 wherein the pressure regulation comprises feeding pressurized fluid to the reaction zone to achieve a desired degree of fluidization.

6. The process of claim 3 wherein the pressure regulation is carried in the absence of vacuum draw from the reaction zone.

7. The process of claim 1 further comprising charging diamine liquid or vapor to the reaction zone.

8. The process of claim 7 wherein a diamine charge rate is controlled to maintain a desired diacid: diamine balance in the reaction zone.

9. The process of claim 1 further comprising charging diamine liquid or vapor in a distributed manner at different points across the reaction zone.

10. The process of claim 9 wherein a diamine charge rate distribution is controlled to maintain a desired diacid: diamine balance profile across the reaction zone and achieve the desired diacid: diamine balance in the polyamide or the polyamide salt.

11. The process of claim 1 further comprising introducing water or steam to the reaction zone.

12. The process of claim 11 wherein the water or steam is introduced in a distributed manner at different points across the reaction zone.

13. The process of claim 11 wherein a steam introduction rate is controlled to improve at least one product quality measure comprising whiteness.

* * * * *